US009296016B2

(12) United States Patent
Nakano et al.

(10) Patent No.: US 9,296,016 B2
(45) Date of Patent: Mar. 29, 2016

(54) MULTILAYER COATING FILM STRUCTURE AND METHOD FOR FORMING MULTILAYER COATING FILM

(75) Inventors: Sakura Nakano, Higashi-Hiroshima (JP); Takakazu Yamane, Hiroshima (JP); Hiroshi Kubota, Hiroshima (JP); Takako Ishibashi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 775 days.

(21) Appl. No.: 13/033,447

(22) Filed: Feb. 23, 2011

(65) Prior Publication Data

US 2011/0236655 A1 Sep. 29, 2011

(30) Foreign Application Priority Data

Mar. 29, 2010 (JP) ................................ 2010-076131

(51) Int. Cl.

*B32B 7/02* (2006.01)
*B23P 19/04* (2006.01)
*B05D 7/22* (2006.01)
*B05D 7/14* (2006.01)
*B05D 7/00* (2006.01)
*B05D 5/06* (2006.01)

(52) U.S. Cl.

CPC .. *B05D 7/22* (2013.01); *B05D 7/14* (2013.01); *B05D 7/53* (2013.01); *B05D 7/57* (2013.01); *B05D 5/06* (2013.01); *B05D 2252/10* (2013.01); *Y10T 29/49888* (2015.01); *Y10T 428/24942* (2015.01)

(58) Field of Classification Search

CPC ............ B05D 7/14–7/18; B05D 7/50–7/5885; B05D 5/06–5/068; Y10T 428/24942

See application file for complete search history.

(56) References Cited

U.S. PATENT DOCUMENTS

2003/0201182 A1* 10/2003 Nakamura ............... B05D 7/14 204/484
2010/0151258 A1* 6/2010 Okuma ......................... 428/448

FOREIGN PATENT DOCUMENTS

| | | | | | |
|---|---|---|---|---|---|
| EP | 0987062 | A2 | | 3/2000 | |
| JP | 08-157753 | A | | 6/1996 | |
| JP | 10-015481 | A | | 1/1998 | |
| JP | 2002053997 | A | * | 2/2002 | ............ C25D 13/00 |
| JP | 2003-093966 | A | | 4/2003 | |
| JP | 2004-337691 | A | | 12/2004 | |

(Continued)

OTHER PUBLICATIONS

Machine translation of JP 2002-053997. Retrieved Aug. 26, 2013.*

(Continued)

*Primary Examiner* — Prashant J Khatri
(74) *Attorney, Agent, or Firm* — Studebaker & Brackett PC

(57) ABSTRACT

A double-structure coated object includes an outer plate portion configured to produce a target color by stacking a coating film of a first paint and a coating film of a second paint, and an inner plate portion on which a coating film of the second paint is formed. When the coating film is formed on the inner plate portion, and then the first paint and the second paint are sequentially applied to the outer plate portion, paint dust on the inner plate portion is prevented from causing viewers to feel something different about color. To achieve this, the ratio (1BC)/(1BC+2BC) of the spectral reflectance (1BC) of the color of the coating film made of the first paint to the spectral reflectance (1BC+2BC) of the target color is configured to fall within a predetermined range.

6 Claims, 10 Drawing Sheets

(56) References Cited

FOREIGN PATENT DOCUMENTS

| | | | | |
|---|---|---|---|---|
| JP | 2008-086957 | A | | 4/2008 |
| JP | 2010029765 | A | * | 2/2010 |
| WO | 2006/017197 | A1 | | 2/2006 |
| WO | 2006/062666 | A1 | | 6/2006 |
| WO | 2007/146386 | A2 | | 12/2007 |
| WO | 2008/051346 | A1 | | 5/2008 |

OTHER PUBLICATIONS

Dobrowolski, J.A. (eds. Bass et al.). "Optical Properties of Films and Coatings". Handbook of Optics: vol. I, Fundamentals, Techniques and Design, (1995); pp. 42.3-42.130.*
Machine translation of JP2010-029765. Retrieved May 28, 2015.*
"DuPont Polymers Light & Science". DuPont, (2007); pp. 1-20.*

* cited by examiner

MULTILAYER COATING FILM STRUCTURE AND METHOD FOR FORMING MULTILAYER COATING FILM

CROSS-REFERENCE TO RELATED APPLICATION

This application claims priority to Japanese Patent Application No. 2010-076131 filed on Mar. 29, 2010, the disclosure of which including the specification, the drawings, and the claims is hereby incorporated by reference in its entirety.

BACKGROUND

The present disclosure relates to multilayer coating film structures and methods for forming a multilayer coating film.

In the coating of metal products requiring resistance to weathering, a multilayer coating film structure is typically used which includes an intermediate coating film formed on an anticorrosive electrodeposition coating film (undercoating film), and a top coating film superimposed on the intermediate coating film. For example, in the coating of an automotive body, an undercoating (electrodeposition coating), an intermediate coating, and a top coating (a base coating and a clear coating) have been conventionally applied to the automotive body in a sequential order, and a solvent-based paint has been used for the intermediate coating and the base coating. The intermediate coating film is provided to increase the light resistance, etc. For example, when an undercoating film made of an epoxide-based cationic electrodeposition paint is exposed to high doses of ultraviolet radiation, a surface part of the undercoating film is deteriorated, thereby separating a coating film on the undercoating film from the undercoating film. To address this problem, the electrodeposition film is protected from ultraviolet rays by the intermediate coating film.

By contrast, in some cases, in view of savings in resources, simplification of the process steps, cost reduction, etc., such an intermediate coating film is omitted, and a top coating film is superimposed directly on an electrodeposition coating film. Specifically, a water-based paint is used for a base coating, the water-based coating includes two layers of a first base coating film and a second base coating film, and light interception characteristics are imparted to the first base coating film, thereby omitting an intermediate coating.

Incidentally, as a method for coating an automotive body, the following method has been used: a base paint is applied to an inner plate portion, such as a pillar on the inside of doors and an engine compartment wall inside a hood; then outer plate members, such as the doors and the hood, are fitted onto the inner plate portion; and in this situation, a base paint is applied to entire outer plate portions of an automotive body including the outer plate members. Japanese Patent Publication No. 2003-93966 describes a measure for solving one problem of the above-described coating method. The problem is that when a base paint is applied to the vicinity of the border between the inner plate portion and each of the outer plate portions twice, this increases the film thickness, and that adhesion of paint dust flying from a coating gun to the inner plate portion during the coating of the outer plate portions causes viewers to feel something different about the hue of a shaded portion of the inner plate portion. To solve the above problem, the shaded portion of the coating film for the inner plate portion and highlight portions of the coating films for the outer plate portions provide substantially the same hue.

SUMMARY

When, in the coating of the inner plate portion and the outer plate portion of the automotive body on each of which an electrodeposition coating film is formed, a base coating for the outer plate portion includes two layers of a first base coating film and a second base coating film as described above, the coating color of the inner plate portion is easily matched to that of the outer plate portion by forming a coating film over the inner plate portion using the same paint as that of the second base coating film. In this case, when, after the coating of, e.g., a B pillar (inner plate portion) of the automotive body, the outer plate portions of the automotive body are coated using a coating gun with front doors and rear doors closed, a paint dust generated during the formation of the first base coating film and a paint dust generated during the formation of the second base coating film pass through the clearances between the front doors and the rear doors, then reach the inside of the doors, and thus, adhere to the B pillar.

FIG. 1 schematically illustrates the conditions of coating films for an inner plate portion 1 and outer plate portions 2 in the coating method. Specifically, an electrodeposition coating film 3 and a top coating film (2BC) 4 are stacked on the inner plate portion 1. An electrodeposition coating film 5, a first base coating film (1BC) 6, a second base coating film (2BC) 7, and a clear coating film 8 are stacked on each of the outer plate portions 2. A paint dust (1BC dust) 11 and a paint dust (2BC dust) 12 pass through a clearance 9 between the outer plate portions 2, 2, and adhere onto the top surface of the top coating film (2BC) 4 for the inner plate portion 1.

In this case, when the color of the first base coating film (1BC) 6 and the color of the second base coating film (2BC) 7 are identical, even adhesion of the paint dusts (the 1BC dust and the 2BC dust) 11 and 12 to the inner plate portion 1 does not cause a portion of the inner plate portion 1 to which the dusts 11 and 12 adhere to be prominent. However, as described above, when a base coating includes two layers of a first base coating film and a second base coating film in order to omit an intermediate coating, light interception characteristics needs to be imparted to the first base coating film. When using a paint containing a pigment with significant light interception characteristics or a paint containing a material capable of intercepting light to form the first base coating film, even if a base paint which is similar in color to the paint for the first base coating film is used for the second base coating film, the color of the first base coating film does not always correspond to the color of the second base coating film due to the difference between pigments, the difference between the types of the material capable of intercepting light, the difference between the amounts of addition of the material capable of intercepting light, etc. For example, the lightness of the color of the first base coating film differs from that of the second base coating film. Therefore, the hue of a portion of the inner plate portion to which dust adheres is different from that of the other portion of the inner plate portion. This may cause viewers to feel something different.

Therefore, the present disclosure provides a multilayer coating film structure which is suitable for production of a desired coating color and can prevent or reduce the conditions causing viewers to feel something different as described above while ensuring the light interception characteristics of the multilayer coating film, and a method for forming the multilayer coating film.

The present inventors have conducted various experiments and studies to solve the above problem. Consequently, the present inventors have recognized that in a multilayer coating film structure configured such that both of coating films, i.e., a first layer and a second layer which is coated over the first layer, produce a target color, when the ratio between the spectral reflectance of the target color and that of the color of the first layer falls within a predetermined range, this is advantageous for a reduction or elimination of the conditions causing viewers to feel something different about color due to the above-described paint dusts. Thus, the present inventors have completed the present invention.

Here, examples of the target color are divided broadly into achromatic colors and chromatic colors. Depending on the coating color, the first layer may have lower lightness than the second layer, and on the other hand, the second layer may have lower lightness than the first layer. Therefore, solutions according to the present disclosure will be described below on a case-by-case basis.

Specifically, a multilayer coating film structure includes: a first layer configured to coat a coated object; and a second layer configured to coat the coated object and superimposed on the first layer. The multilayer coating film structure is configured to produce a target color with both the coating films which are the first layer and the second layer. In a situation where the target color is an achromatic color, and a color of the first layer has lower lightness than a color of the second layer, a ratio (1BC)/(1BC+2BC) of a spectral reflectance (1BC) of the color of the first layer to a spectral reflectance (1BC+2BC) of the target color is greater than or equal to about 0.8 and less than or equal to about 1.0 in an entire visible wavelength region of about 380-780 nm.

Here, the spectral reflectances denote reflectances corresponding to light wavelengths and determined by absorption spectrophotometry using a spectrophotometer.

In the multilayer coating film structure, in the situation where the target color is a chromatic color, and a color of the first layer has lower lightness than a color of the second layer, when a hue range is indicated by dividing a Munsell hue circle into one hundred sectors with a hue of the target color set at 0 and increasing a hue number to +50 in a counterclockwise direction while decreasing the hue number to −50 in a clockwise direction, a ratio (1BC)/(1BC+2BC) of a spectral reflectance (1BC) of the color of the first layer to a spectral reflectance (1BC+2BC) of the target color is greater than or equal to about 0.7 and less than or equal to about 1.0 in a portion of the indicated hue range which is greater than or equal to about −5 and less than or equal to about +5, and the ratio (1BC)/(1BC+2BC) is greater than or equal to about 0.9 and less than or equal to about 1.1 outside a portion of the indicated hue range which is greater than or equal to about −30 and less than or equal to about +30.

Here, the Munsell hue circle is obtained by evenly spacing "R (red), Y (yellow), G (green), B (blue), and P (purple)" serving as five principal hues in the clockwise direction. Each of "YR (yellow-red), GY (yellow-green), BG (blue-green), PB (blue-purple), and RP (red-purple)" is inserted between corresponding ones of the five principal hues, and thus, the Munsell hue circle includes a total of ten principal hues. The ten principal hues may be each divided into two steps, and the numbers "5" and "10" may be used to represent the two steps, thereby providing 20 steps. Alternatively, the ten principal hues may be each divided into four steps, and the numbers "2.5," "5," "7.5," and "10" may be used to represent the four steps, thereby providing 40 steps. Still alternatively, the ten principal hues may be each divided into 10 steps, thereby providing 100 steps. The number "5" is always used to represent the central step of each of the principal hues, and this step functions as a representative hue.

In the multilayer coating film structure, in the situation where the target color is either an achromatic color or a chromatic color, and a color of the first layer has higher lightness than a color of the second layer, a ratio (1BC)/(1BC+2BC) of a spectral reflectance (1BC) of the color of the first layer to a spectral reflectance (1BC+2BC) of the target color is greater than or equal to about 1.0 and less than or equal to about 1.1 in an entire visible wavelength region of about 380-780 nm.

In each of the above situations, the spectral reflectance ratio (1BC)/(1BC+2BC) configured as described above facilitates allowing the coated object to have a desired color while ensuring light interception characteristics. Assume that when the coated object is a double structure including an inner plate portion and an outer plate portion, the inner plate portion is coated with the same paint as the paint of the second layer, and then the first layer and the second layer are applied to the outer plate portion with the outer plate portion fitted onto the inner plate portion. In this case, even when the paint dust has adhered to the inner plate portion, the spectral reflectance ratio (1BC)/(1BC+2BC) configured as described above prevents or reduces the conditions causing viewers to feel something different about the color of a region of the inner plate portion.

In the above situations, an electrodeposition coating film may be formed on a surface of the coated object, and the first layer may be superimposed directly on a surface of the electrodeposition coating film.

Next, a method for forming a multilayer coating film will be described. This method is a method for forming a multilayer coating film for a double-structure coated object including an inner plate portion and an outer plate portion covering the inner plate portion, where the outer plate portion is configured to produce a target color with both coating films which are a first layer coating the outer plate portion and a second layer superimposed on the first layer, and a coating film of a same paint as a paint of the second layer is formed on the inner plate portion. The method includes: preparing a first paint for forming the first layer, and a second paint for forming the second layer and the coating film for the inner plate portion; coating the inner plate portion with the second paint; allowing the outer plate portion to cover the inner plate portion coated with the second paint; and coating the outer plate portion covering the inner plate portion with the first paint and the second paint sequentially, thereby forming both the coating films which are the first layer and the second layer.

In the situation where the target color is an achromatic color, and a color of the first paint has lower lightness than a color of the second paint, the first paint and the second paint are used which satisfy a condition that a ratio (1BC)/(1BC+2BC) of a spectral reflectance (1BC) of a color of the first layer to a spectral reflectance (1BC+2BC) of the target color is greater than or equal to about 0.8 and less than or equal to about 1.0 in an entire visible wavelength region of about 380-780 nm.

In the situation where the target color is a chromatic color, and a color of the first paint has lower lightness than a color of the second paint, the first paint and the second paint are used which satisfy a condition that when a hue range is indicated by dividing a Munsell hue circle into one hundred sectors with a hue of the target color set at 0 and increasing a hue number to +50 in a counterclockwise direction while decreasing the hue number to −50 in a clockwise direction, a ratio (1BC)/(1BC+2BC) of a spectral reflectance (1BC) of a color of the first layer to a spectral reflectance (1BC+2BC) of the target color is greater than or equal to about 0.7 and less than or equal to about 1.0 in a portion of the indicated hue range which is greater than or equal to about −5 and less than or equal to about +5, and the ratio (1BC)/(1BC+2BC) is greater than or equal to about 0.9 and less than or equal to about 1.1 outside a portion of the indicated hue range which is greater than or equal to about −30 and less than or equal to about +30.

In the situation where a color of the first paint has higher lightness than a color of the second paint, when the target color is either of a chromatic color and an achromatic color, the first paint and the second paint are used which satisfy a condition that a ratio (1BC)/(1BC+2BC) of a spectral reflectance (1BC) of the color of the first paint to a spectral reflectance (1BC+2BC) of the target color is greater than or equal to about 1.0 and less than or equal to about 1.1 in an entire visible wavelength region of about 380-780 nm.

According to the multilayer coating film formation method corresponding to each of the above situations, even when dusts of the first paint and the second paint have adhered to the inner plate portion during coating for the outer plate portion, the spectral reflectance ratio (1BC)/(1BC+2BC) configured as described above prevents or reduces the conditions causing viewers to feel something different about the color of a region of the inner plate portion, and facilitates allowing the coated object to have a desired color while ensuring light interception characteristics.

In the method under each of the above situations, the first paint and the second paint are preferably applied wet-on-wet onto the outer plate portion. Thus, the dusts of the first paint and the second paint adhering to the inner plate portion are more likely to be mixed together, thereby providing an advantage for prevention or reduction of the conditions causing viewers to feel something different about color and reducing the loss of the smoothness of the coating film arising from the dusts.

DETAILED DESCRIPTION

Figure 1:
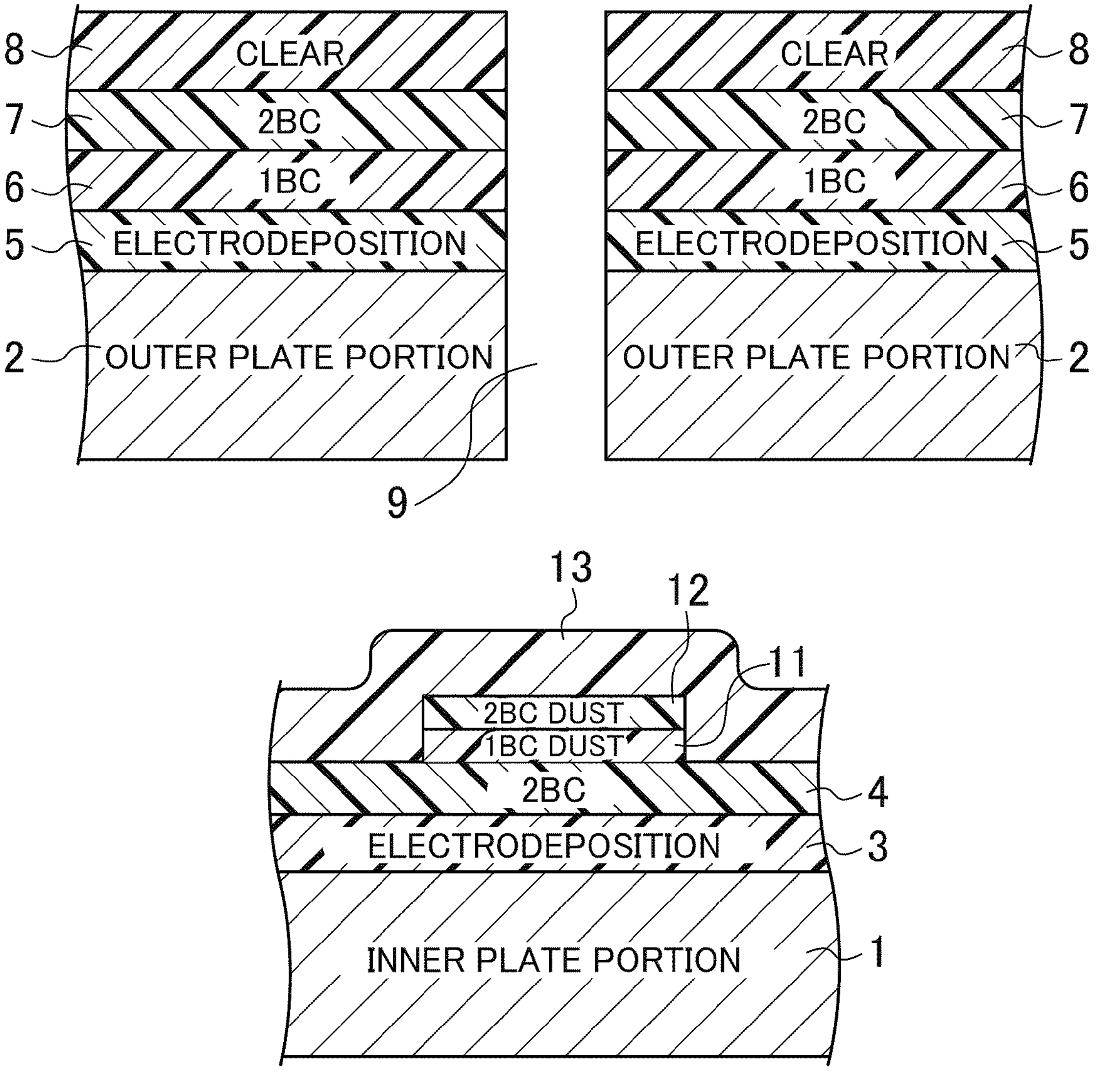
FIG. 1 is a cross-sectional view schematically illustrating a multilayer coating film structure of a coated object having a double structure.

Modes for carrying out the present disclosure will be described below with reference to the drawings. The following preferred embodiments are set forth merely for the purposes of examples in nature, and are not intended to limit the scope, applications, and use of the invention.

As described above, FIG. 1 schematically illustrates a multilayer coating film structure of a coated object having a double structure including an inner plate portion 1 and outer plate portions 2 covering the inner plate portion 1. An automotive body includes such a coated object having a double structure. For example, a B pillar of an automotive body corresponds to the inner plate portion 1, a front door corresponds to one of the outer plate portions 2, and a rear door corresponds to the other one thereof. An electrodeposition coating film 3 is formed on the surface of the inner plate portion 1 by cationic electrodeposition, and electrodeposition coating films 5 are formed on the surfaces of the outer plate portions 2 by cationic electrodeposition.

A first base coating film (1BC) 6 and a second base coating film (2BC) 7 are formed on the electrodeposition coating film 5 of each of the outer plate portions 2 by using water-based paints of different colors. Specifically, a water-based base paint containing a pigment with superior light interception characteristics is used to form the first base coating film (1BC) 6, and a water-based base paint containing a pigment with relatively inferior light interception characteristics, i.e., a pigment which is advantageous for coloring, is used to form the second base coating film (2BC) 7. Such different pigments cause the first base coating film (1BC) 6 and the second base coating film (2BC) 7 to have at least different luminosities (different colors) even when these films 6 and 7 have, e.g., the same hue. A clear coating film 8 is formed on the second base coating film (2BC) 7.

A top coating film (2BC) 4 is formed on the electrodeposition coating film 3 located on the inner plate portion 1. The same water-based base paint as the base paint of the second base coating film (2BC) 7 is used to form the top coating film (2BC) 4.

Such a coating film structure can be formed by the following method. Specifically, the top coating film (2BC) 4 made of the same water-based base paint as the base paint of the second base coating film (2BC) 7 is formed on the electrodeposition coating film 3 located on the inner plate portion 1 by using a coating gun. Then, the outer plate portions 2 on each of which the electrodeposition coating film 5 is formed are fitted onto the inner plate portion 1 on which the films 3 and 4 are located. In this situation, a water-based paint with superior light interception characteristics and a water-based base paint with relatively inferior light interception characteristics are applied wet-on-wet onto the electrodeposition coating film 5 located on each of the outer plate portions 2 by using a coating gun, thereby forming the first base coating film (1BC) 6 and the second base coating film (2BC) 7. Both the base coating films 6 and 7 are thermoset, and then a clear paint is applied onto the second base coating films (2BC) 7, thereby forming the clear coating films 8.

In the above-described coating method, during the application of the first base coating films (1BC) 6 onto the outer plate portions 2, a generated paint dust (1BC dust) passes through a clearance 9 between the outer plate portions 2, 2, and reaches the inside of the outer plate portions 2. Furthermore, also during the application of the second base coating films (2BC) 7, a generated paint dust (2BC dust) passes through the clearance 9 between the outer plate portions 2, 2, and reaches the inside of the outer plate portions 2. Therefore, a paint dust (1BC dust) 11 and a paint dust (2BC dust) 12 adhere to the surface of the top coating film (2BC) 4 located on the inner plate portion 1 in a streak extending along the clearance 9. In FIG. 1, the reference character 13 denotes a clear coating film for the inner plate portion 1.

A base coating technique has been developed which is for use in the outer plate portions 2 and in which even when the paint dusts 11 and 12 adhere to the surface of the top coating film (2BC) 4 located on the inner plate portion 1 in a streak, they are not prominent. Thus, the present disclosure is provided. The technique will be specifically described below.

<First Embodiment>

This embodiment corresponds to a case in which an achromatic color is obtained, as the color of outer plate portions, by the first base coating films (1BC) 6 and the second base coating films (2BC) 7.

A first base paint which is for use in first base coating films (1BC), and which has a white color (white 1) with relatively superior light interception characteristics, and a second base paint which is for use in second base coating films (2BC) and an inner plate portion, and which has a white color (white 1) with relatively inferior light interception characteristics were prepared. When the inner plate portion 1 and the outer plate portions 2 were coated by the above-described coating method, the paint dust (1BC dust) 11 and the paint dust (2BC dust) 12 were not recognized to cause viewers to feel something different about color even with adhesion of the paint dusts to the surface of the top coating film (2BC) 4 on the inner plate portion 2 in a streak.

By contrast, a first base paint having a silver color (metallic silver 1) with relatively superior light interception characteristics, and a second base paint having a silver color (metallic silver 1) with relatively inferior light interception characteristics were prepared. When the inner plate portion 1 and the outer plate portions 2 were coated by a method similar to the method for the white paints, viewers felt something different about the color of the inner plate portion 1. Specifically, it was determined by visual inspection that the paint dusts had adhered to the top coating film (2BC) 4 in a streak.

Here, a test piece (1BC+2BC) obtained by sequentially applying both the first and second base paints having the white color (white 1) wet-on-wet onto an electrodeposition coating film, and a test piece (1BC) obtained by applying only the first base paint onto an electrodeposition coating film were fabricated. The spectral reflectances of the applied coating films of the fabricated test pieces were measured in conformity with the method defined in JIS R 3106 by using a spectrophotometer.

Specifically, a bundle of rays emitting from the exit slit of the spectrophotometer with an integrating sphere for light reception was launched into the coating film surface of each of the test pieces at an entry angle which does not exceed 15°, and specular reflected light beams and diffuse reflected light beams were received by the integrating sphere, thereby measuring the spectral reflectances. The reflectances were determined by being compared with the reflectance of a standard white surface (an object obtained by molding powders of barium sulfate). The above method for measuring the spectral reflectances is used also in the other embodiment described below. The measurement results are illustrated in FIG. 2.

Furthermore, a test piece (1BC+2BC) obtained by sequentially applying both the first and second base paints having the silver color (metallic silver 1), and a test piece (1BC) obtained by applying only the first base paint were fabricated in a manner similar to the manner for the white color. The spectral reflectances of the applied coating films of the fabricated test pieces were measured by using a spectrophotometer. The measurement results are illustrated in FIG. 3.

Figure 2:
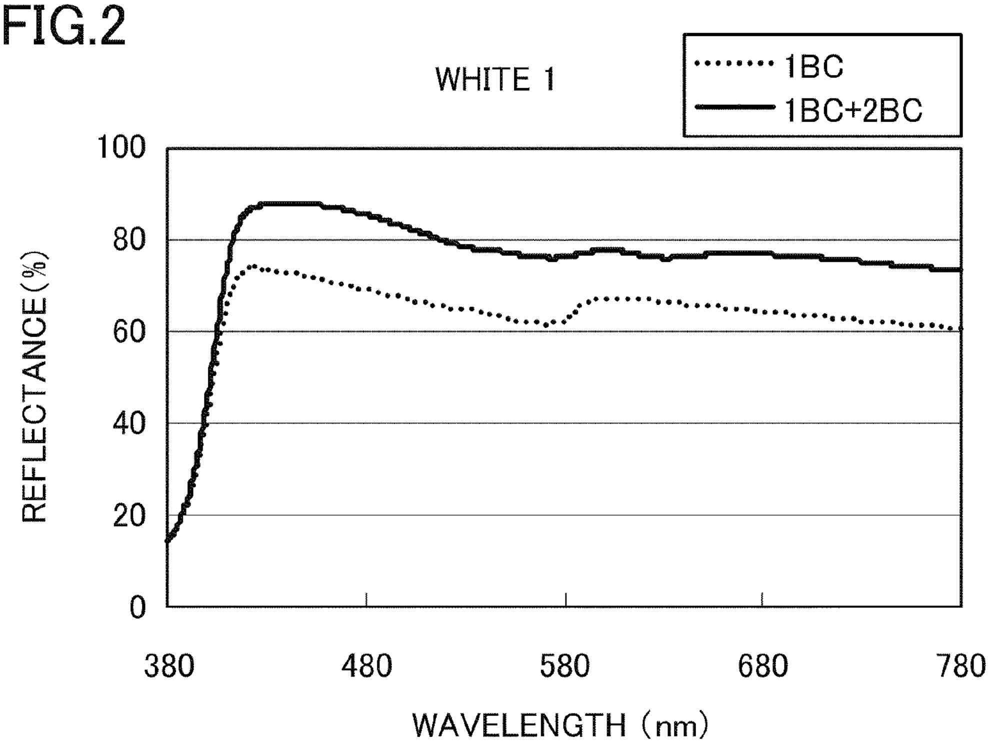
FIG. 2 is a graph illustrating spectral reflectances of an achromatic coating color (white 1).
Figure 3:
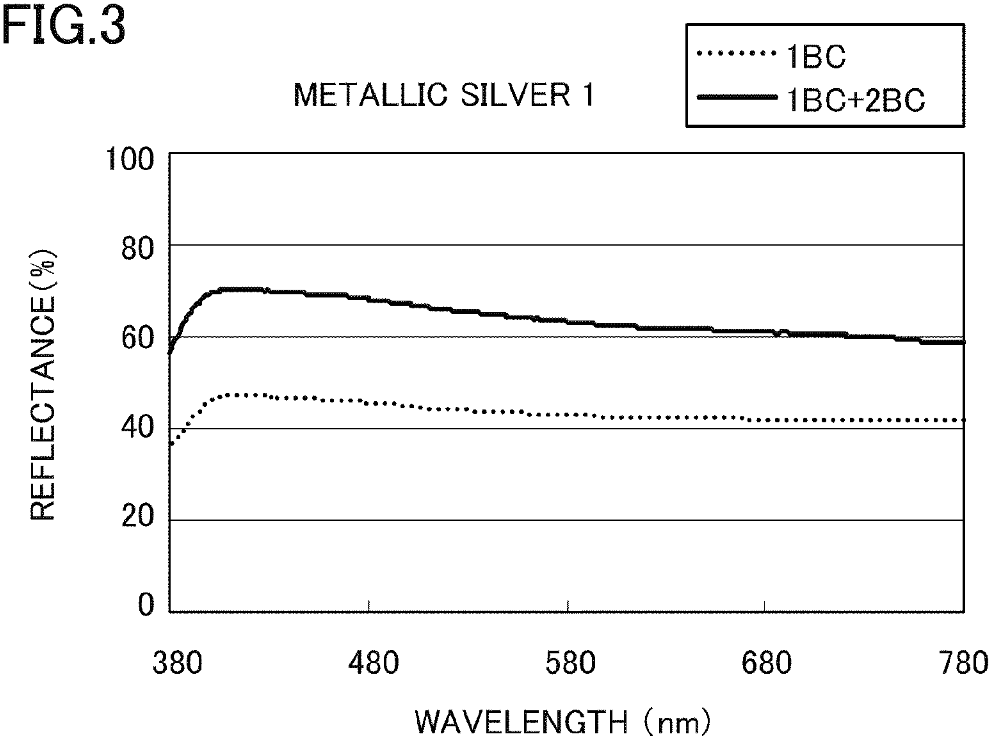
FIG. 3 is a graph illustrating spectral reflectances of an achromatic coating color (metallic silver 1).

Referring to FIGS. 2 and 3, in the cases of both the white 1 and the metallic silver 1, the colors of the test pieces (1BC) have lower reflectances than the colors of the test pieces (1BC+2BC). Since there is a strong correlation between lightness and spectral reflectance, this shows that the lightness of the color of the first base coating film (1BC) is lower than that of the color of the second base coating film. That is, the color of the first base coating film (1BC) is darker than that of the second base coating film.

Figure 4:
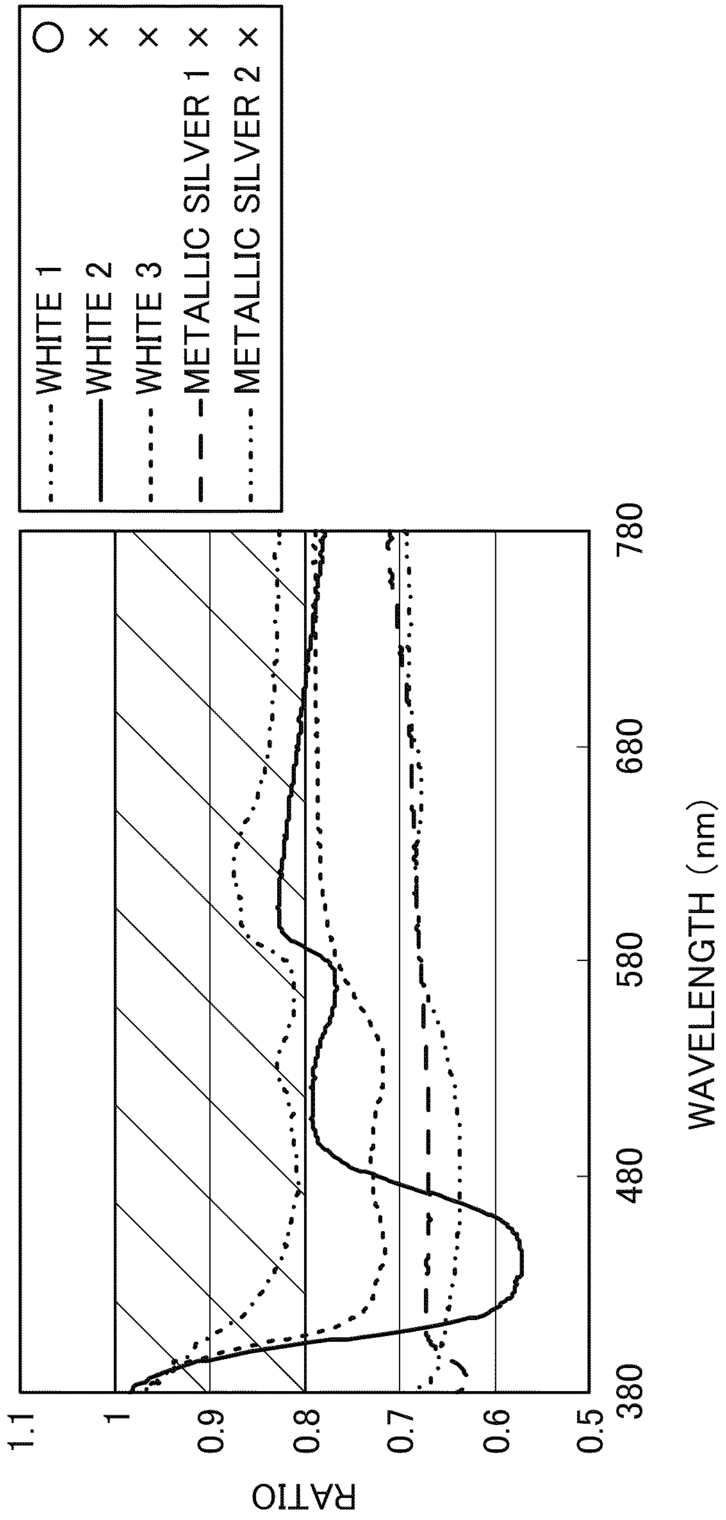
FIG. 4 is a graph illustrating the ratio between spectral reflectances of an achromatic coating color when the lightness of a first base coating film is lower than that of a second base coating film.

Next, the ratio (1BC)/(1BC+2BC) of the spectral reflectance of the color of the test piece (1BC) for each of the white 1 and the metallic silver 1 to that of the color of the corresponding test piece (1BC+2BC) was determined. The results are illustrated in FIG. 4. In the white 1 which did not cause viewers to feel something different about color due to paint dusts, the above ratio falls within the range of about 0.8-1.0 (i.e., greater than or equal to about 0.8 and less than or equal to about 1.0) in an entire visible wavelength region of 380-780 nm. Here, "○○-xx" is used below to denote "greater than or equal to ○○ and less than or equal to xx." On the other hand, in the metallic silver 1 which caused viewers to feel something different about color due to paint dusts, the above ratio is less than or equal to about 0.7.

Since there is a strong correlation between lightness and spectral reflectance, the ratio serves as an index for evaluating the influence of the coating film of the first base paint on the lightness of the color provided by the multilayer coating film of the first base paint and the second base paint. Situations where the ratio is close to 1.0 can show that even when the coating film of the first base paint and the coating film of the second base paint are stacked, the difference in the lightness of the color from the coating film of only the second base paint is small. This will be described below with reference to the paint dusts.

Specifically, when only a paint dust (2BC) adheres to the top coating film (2BC) for the inner plate portion, this does not cause viewers to feel something different about color because the dust is made of the same second base paint as the base paint of the top coating film. When not only the paint dust (2BC) but also a paint dust (1BC) adhere to the top coating film (2BC), this may cause viewers to feel something different about color. In the case of the white 1, the ratio is close to 1.0, and thus, the paint dust (1BC) has an insignificant influence on the lightness of the color. Therefore, it is recognized that viewers have not felt something different about the color. By contrast, in the case of the metallic silver 1, the ratio is less than or equal to 0.7, and thus, the paint dust (1BC) has a significant influence on the lightness of the color. Therefore, it is recognized that viewers have felt something different about the color.

FIG. 4 also illustrates the spectral reflectance ratios (1BC)/(1BC+2BC) of colors other than the white 1 and the metallic silver 1, i.e., white 2, white 3, and metallic silver 2. Measurements of the spectral reflectances of the white 2, the white 3, and the metallic silver 2 also show that the lightness of the color produced by the first base paint with relatively superior light interception characteristics was lower than that of the color produced by the second base paint with relatively inferior light interception characteristics.

Although the white 2 and the white 3 each have wavelength regions in which the spectral reflectance ratio is greater than or equal to 0.8, the ratio is generally less than 0.8. In the entire visible wavelength region, the ratio of the metallic silver 2 is less than or equal to 0.7. Therefore, it had been anticipated based on the results of the white 1 and the metallic silver 1 that the white 2, the white 3, and the metallic silver 2 would cause viewers to feel something different about the color due to paint dusts, and tests using the above-described coating method showed something different about the color as had been anticipated. In FIG. 4, the color which did not cause viewers to feel something different about the color is marked with the symbol "○," and the colors which caused viewers to feel something different about the colors are marked with the symbol "x." This applies to FIGS. 5, 7, and 13 described below. Table 1 illustrates the ratios, etc., of the above colors (and the other colors described below) together.

TABLE 1

| | | | Evaluation of Strange Feeling | Spectral Reflectance Ratio | | | |
|---|---|---|---|---|---|---|---|
| | | | | Target Hue Range | | Out-of-Range Wavelength Region | |
| Color System | 2BC/1BC | Coating Color | About Color | Maximum | Minimum | Maximum | Minimum |
| Achromatic Color | Light/Dark | White 1 | ○ | 0.97 | 0.81 | | |
| | | White 2 | x | 0.98 | 0.57 | | |
| | | White 3 | x | 0.97 | 0.71 | | |
| | | Metallic Silver 1 | x | 0.71 | 0.63 | | |
| | | Metallic Silver 2 | x | 0.69 | 0.63 | | |
| | Dark/Light | Metallic Silver 3 | x | 1.24 | 1.03 | | |
| Chromatic Color | Light/Dark | Red | x | 1.02 | 0.69 | 1.35 | 0.69 |
| | | Red Mica 1 | ○ | 0.86 | 0.70 | 1.03 | 0.87 |
| | | Red Mica 2 | x | 0.94 | 0.59 | 0.94 | 0.86 |
| | | Orange Mica 1 | ○ | 1.05 | 0.87 | 1.02 | 0.90 |
| | | Yellow | x | 0.88 | 0.74 | 1.67 | 0.88 |
| | | Green Mica | ○ | 1.00 | 0.98 | 1.01 | 0.99 |
| | | Metallic Blue | x | 0.88 | 0.62 | 0.98 | 0.77 |
| | Dark/Light | Red Mica 3 | x | 1.41 | 1.14 | 2.40 | 1.42 |
| | | Orange Mica 2 | x | 1.35 | 1.12 | 1.57 | 1.33 |
| | | Metallic Yellow | x | 1.02 | 1.00 | 1.25 | 1.01 |
| | | Metallic Green | x | 1.20 | 1.09 | 1.40 | 1.16 |
| | | Blue Mica | ○ | 1.01 | 0.98 | 1.03 | 0.97 |

The maximum and minimum ratios for each of achromatic colors in the entire visible wavelength region are indicated in the "Target Hue Range" Column.

The above description shows that in the case of an achromatic base paint, when the lightness of the color produced by the first base paint is lower than that of the color produced by the second base paint, it is useful in preventing or reducing the conditions causing viewers to feel something different about color that the spectral reflectance ratio (1BC)/(1BC+2BC) is greater than or equal to about 0.8 and less than or equal to about 1.0 in an entire visible wavelength region of about 380-780 nm.

Figure 5:
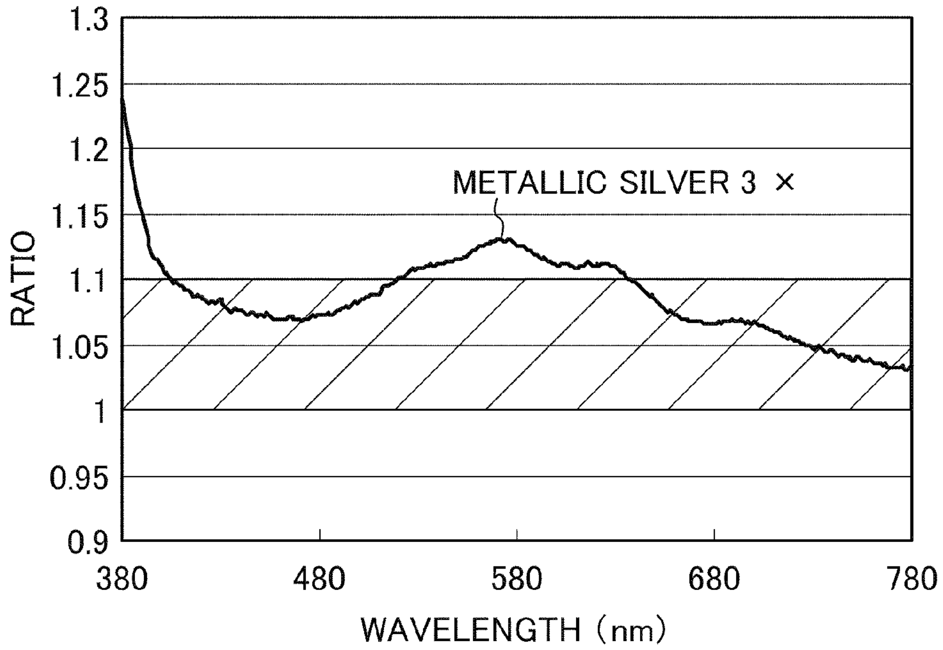
FIG. 5 is a graph illustrating the ratio between spectral reflectances of an achromatic coating color when the lightness of the first base coating film is higher than that of the second base coating film.

Next, a case in which in the use of an achromatic base paint, the lightness of the color produced by the first base paint with relatively superior light interception characteristics is higher than that of the color produced by the second base paint with relatively inferior light interception characteristics will be described. FIG. 5 illustrates the spectral reflectance ratio (1BC)/(1BC+2BC) for a base paint of metallic silver 3. As is clear from FIG. 5, the ratio is greater than or equal to 1. This shows that in the use of the metallic silver 3, the lightness of the color produced by the first base paint is higher than that of the color produced by the second base paint.

However, it was recognized that the metallic silver 3 caused viewers to feel something different about the color of the inner plate portion in the coating method. In FIG. 5, there exists a wavelength region in which the ratio exceeds 1.1. When the lightness of the color produced by the first base paint is lower than that of the color produced by the second base paint as described above, the following result was obtained: as the ratio is closer to 1.0, the difference between the lightness of the color of the multilayer coating film of the first base paint and the second base paint and that of the color of the coating film of only the second base paint is smaller, and thus, paint dusts are less likely to cause viewers to feel something different about color. Those skilled in the art could easily understand that the above result would apply also to a case where the lightness of the color produced by the first base paint is higher than that of the color produced by the second base paint. When there exists a wavelength region in which the ratio exceeds 1.1 as illustrated in FIG. 5, it has been recognized that viewers feel something different about color. Therefore, when the ratio falls within the range of about 1.0-1.1 in the entire visible wavelength region (about 380-780 nm), this can reduce the conditions causing viewers to feel something different about color, and may eventually eliminate the conditions causing viewers to feel something different about color.

<Second Embodiment>

This embodiment corresponds to a case in which a chromatic color is obtained, as the color of outer plate portions by first base coating films (1BC) 6 and second base coating films (2BC) 7.

A first base paint which has a red color (red mica 1) with relatively superior light interception characteristics, and a second base paint which has a red color (red mica 1) with relatively inferior light interception characteristics were prepared. When an inner plate portion 1 and outer plate portions 2 were coated by the above-described coating method, a paint dust (1BC dust) 11 and a paint dust (2BC dust) 12 were not recognized to cause viewers to feel something different about color even with adhesion of the paint dusts to the surface of a top coating film (2BC) 4 on the inner plate portion 2 in a streak.

Figure 6:
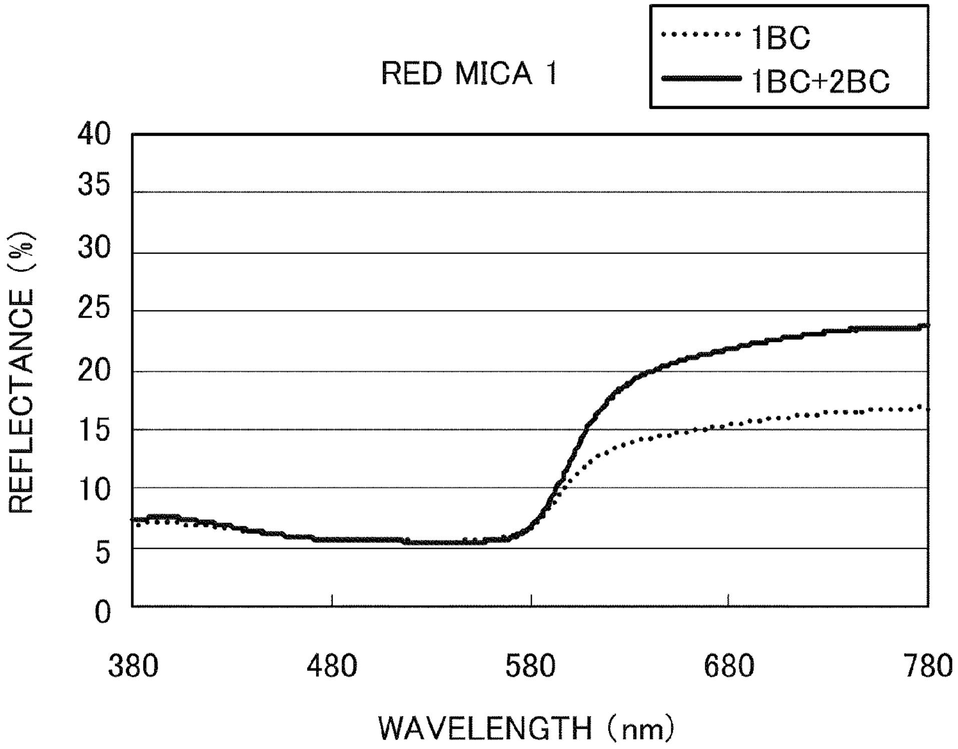
FIG. 6 is a graph illustrating spectral reflectances of a chromatic coating color (red mica 1).

Here, a test piece (1BC+2BC) obtained by sequentially applying both the first and second base paints wet-on-wet onto an electrodeposition coating film, and a test piece (1BC) obtained by applying only the first base paint onto an electrodeposition coating film were fabricated. The spectral reflectances of the applied coating films of the fabricated test pieces were measured by using a spectrophotometer. The measurement results are illustrated in FIG. 6. The results show that the color of the test piece (1BC) has a lower reflectance than that of the test piece (1BC+2BC), and thus, the lightness of the color of the first base coating film (1BC) is lower than that of the color of the second base coating film. That is, the color of the first base coating film (1BC) is darker than that of the second base coating film.

Figure 7:
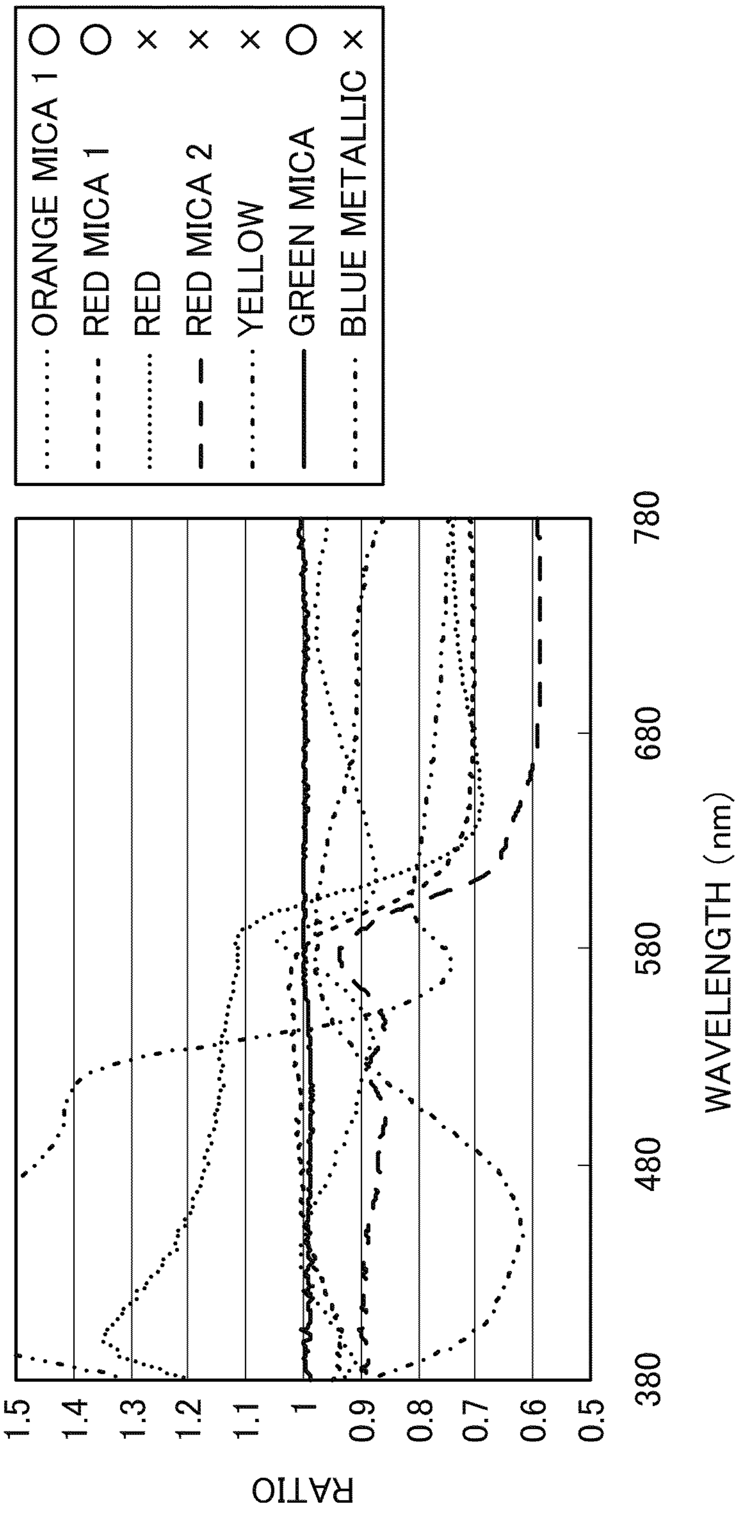
FIG. 7 is a graph illustrating the ratio between spectral reflectances of each of chromatic coating colors when the lightness of the first base coating film is lower than that of the second base coating film.

Next, the spectral reflectance ratio (1BC)/(1BC+2BC) was determined. The result is illustrated in FIG. 7. FIG. 7 also illustrates the spectral reflectance ratios (1BC)/(1BC+2BC) of colors other than the red mica 1, i.e., red, red mica 2, orange mica 1, yellow, green mica, and metallic blue together. Measurements of the spectral reflectances of these colors show that the lightness of the color produced by the first base paint with relatively superior light interception characteristics was lower than that of the color produced by the second base paint with relatively inferior light interception characteristics.

Although the spectral reflectance ratio (1BC)/(1BC+2BC) of each of red and yellow is greater than about 1 in a shorter wavelength region, the ratio is less than or equal to 1 in a wavelength region in which the spectral reflectances are high (in the case of red, a region with wavelengths longer than about 620 nm, and in the case of yellow, a region with wavelengths in the vicinity of 580 nm). Therefore, also in the use of the red or yellow, the lightness of the color produced by the first base paint is lower than that of the color produced by the second base paint.

Figure 8:
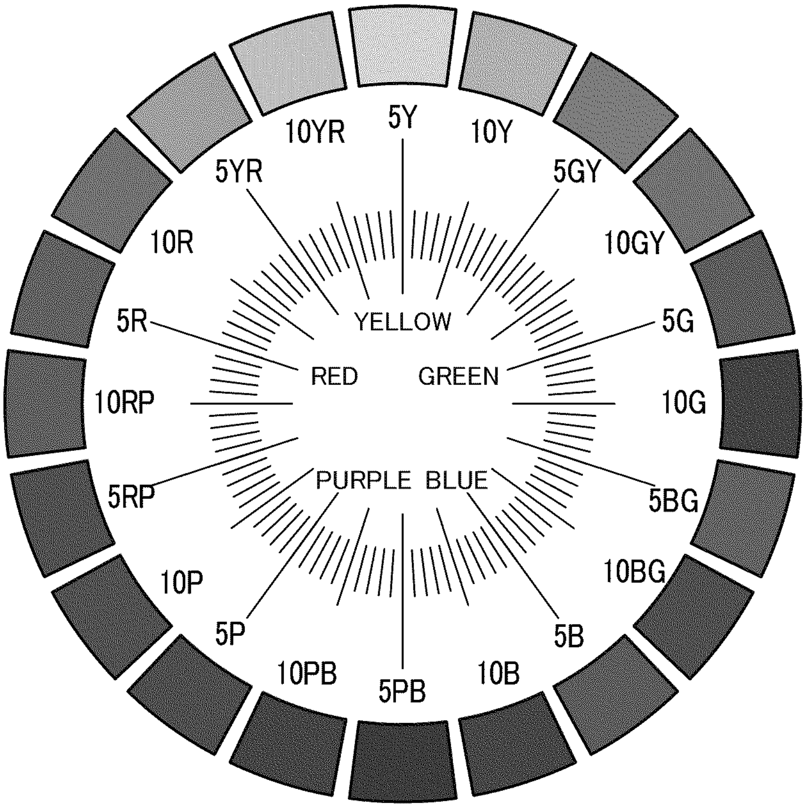
FIG. 8 is a diagram illustrating the Munsell hue circle.
Figure 9:
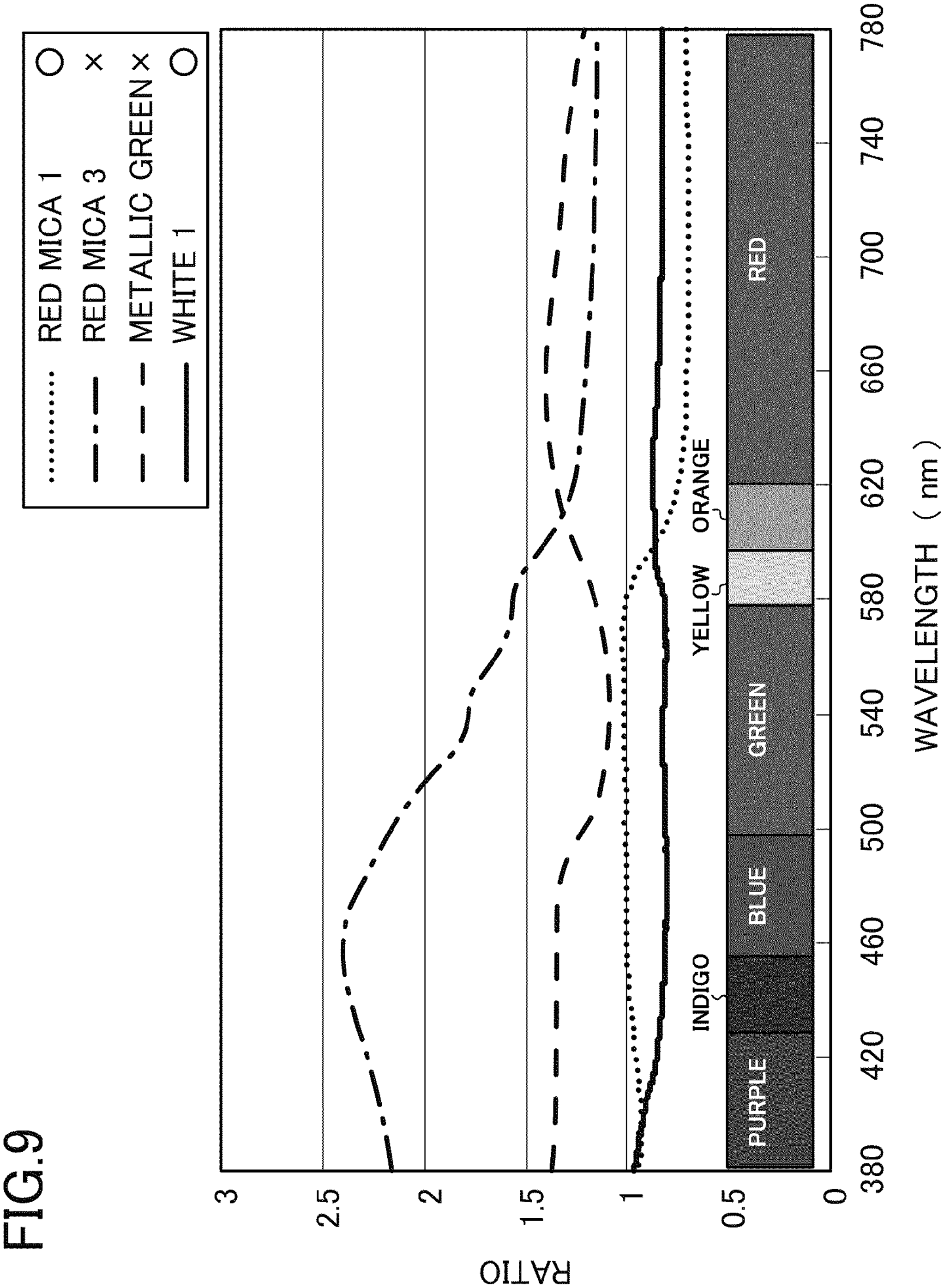
FIG. 9 is a graph illustrating the relationship between the colors of the Munsell hue circle and the wavelengths of the colors, and the ratio between spectral reflectances of each of several coating colors.

Here, an analysis will be performed on the spectral reflectance ratio of each of the coating colors marked with the symbol "○" in FIG. 7 (the colors which did not cause viewers to feel something different) in each of a wavelength region associated with a target hue range corresponding to the coating color and a wavelength region outside the hue range (hereinafter referred to as the "out-of-range wavelength region"). The target hue range is set on the basis of the hue of the coating color in the Munsell hue circle illustrated in FIG. 8. FIG. 9 is a reference drawing illustrating the relationships between the colors in the Munsell hue circle and the wavelengths of the colors, and further illustrates the spectral reflectance ratios of several coating colors for reference.

Figure 10:
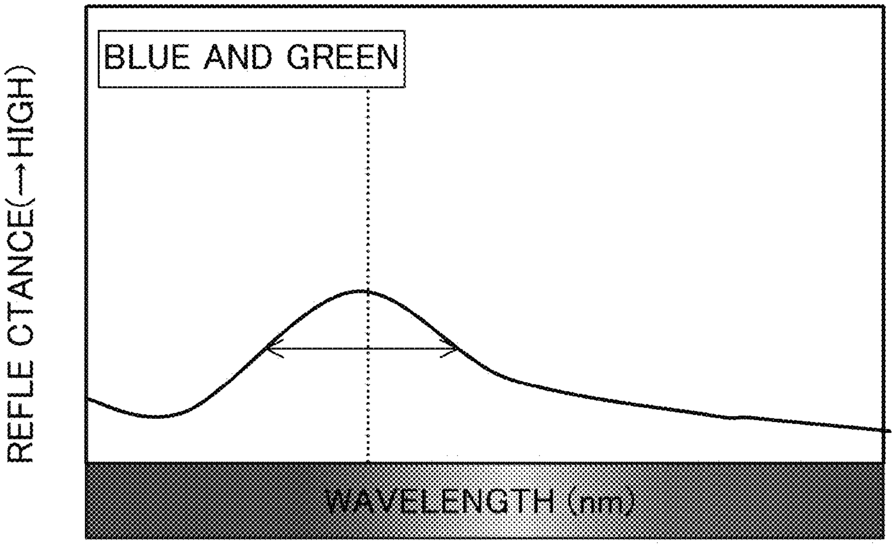
FIG. 10 is a graph for explaining the setting of a target hue range of a blue or green coating color.
Figure 11:
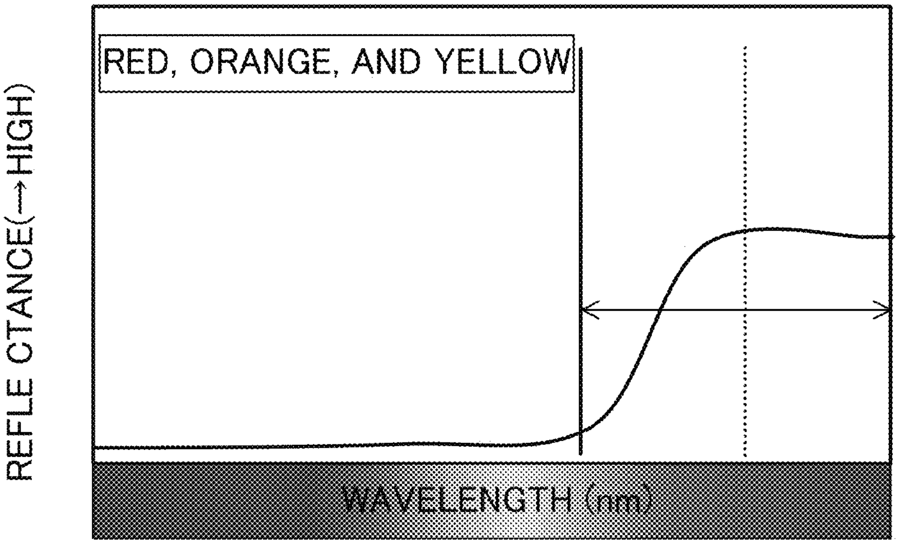
FIG. 11 is a graph for explaining the setting of a target hue range of a red, orange, or yellow coating color.
Figure 12:
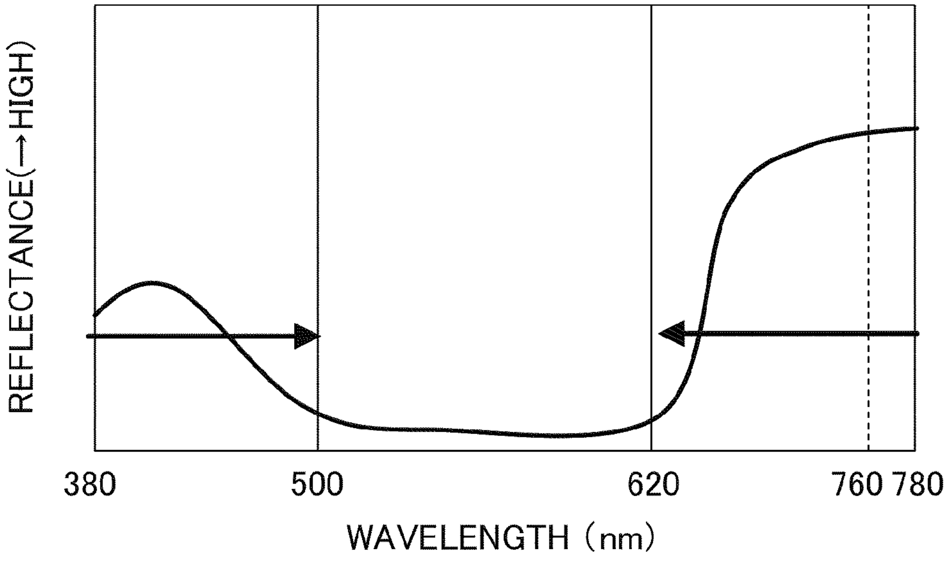
FIG. 12 is a graph for explaining the setting of a target hue range of a purple coating color.

Specifically, when a hue range is indicated by dividing the Munsell hue circle into one hundred sectors with the hue of each of the coating colors set at 0 and increasing the hue number to +50 in the counterclockwise direction while decreasing the hue number to −50 in the clockwise direction, the range which is greater than or equal to −5 and less than or equal to +5 is the target hue range of the coating color. The hue of each of blue and green coating colors is set at the wavelength at which the peak spectral reflectance is obtained as illustrated in FIG. 10, and the hue of each of red, orange, and yellow coating colors is set at a medium wavelength in an increasing wavelength region ranging from the wavelength at which the spectral reflectance starts increasing with an increase in wavelength to the largest wavelength, i.e., 780 nm, as illustrated in FIG. 11. As illustrated in FIG. 12, the hue of a coating color (e.g., purple) of which peak spectral reflectance appears in a shorter wavelength region of the entire visible wavelength region, and which has an increasing wavelength region being similar to that of the red, orange, and yellow and located in a longer wavelength region is set at a medium wavelength (in this figure, 760 nm) in a wavelength region, ranging from the wavelength (in this figure, 620 nm) at which the spectral reflectance starts increasing with an increase in wavelength to the wavelength (in this figure, 500 nm) at which reflection in the shorter wavelength region is weakened, of a wavelength circle formed by coupling between wavelengths of 780 nm and 380 nm as in the hue circle.

The out-of-range wavelength region is outside the hue range which is indicated by using the Munsell hue circle divided into one hundred sectors and which is greater than or equal to −30 and less than or equal to +30 with the hue of the coating color set at 0.

In FIG. 7, the spectral reflectance ratio of the orange mica 1 which did not cause viewers to feel something different about color falls within the range of about 0.7-1.0 in the target hue range (about 590-630 nm), and falls within the range of about 0.9-1.1 in the out-of-range wavelength region. The spectral reflectance ratio of each of the red mica 1 and green mica which similarly did not cause viewers to feel something different about color falls within the range of about 0.7-1.0 in the target hue range, and falls within the range of about 0.9-1.1 in the out-of-range wavelength region.

By contrast, the ratio of red causing viewers to feel something different about color exceeds 1.1 in the out-of-range wavelength region while falling within the range of about 0.7-1.0 in the target hue range. The ratio of red mica 2 causing viewers to feel something different about color is less than 0.7 in the target hue range. The ratio of yellow causing viewers to feel something different about color exceeds 1.1 in the out-of-range wavelength region while falling within the range of about 0.7-1.0 in the target hue range. The ratio of metallic blue causing viewers to feel something different about color is less than 0.7 in the target hue range.

The above description shows that in the case of an achromatic base paint, when the lightness of the coating color produced by the first base paint is lower than that of the coating color produced by the second base paint, it is useful in preventing or reducing the conditions causing viewers to feel something different about color that the spectral reflectance ratio (1BC)/(1BC+2BC) falls within the range of about 0.7-1.0 in the target hue range, and falls within the range of about 0.9-1.1 in the out-of-range wavelength region.

Next, a case in which in the use of a chromatic base paint, the lightness of the coating color produced by the first base paint with relatively superior light interception characteristics is higher than that of the coating color produced by the second base paint with relatively inferior light interception characteristics will be described.

A first base paint which shows a blue mica color being a chromatic coating color and which has relatively superior light interception characteristics, and a second base paint which shows the blue mica color and which has relatively inferior light interception characteristics were prepared. When the inner plate portion 1 and the outer plate portions 2 were coated by the above-described coating method, the paint dust (1BC dust) 11 and the paint dust (2BC dust) 12 were not recognized to cause viewers to feel something different about color even with adhesion of the paint dusts to the surface of the top coating film (2BC) 4 on the inner plate portion 2 in a streak.

Figure 13:
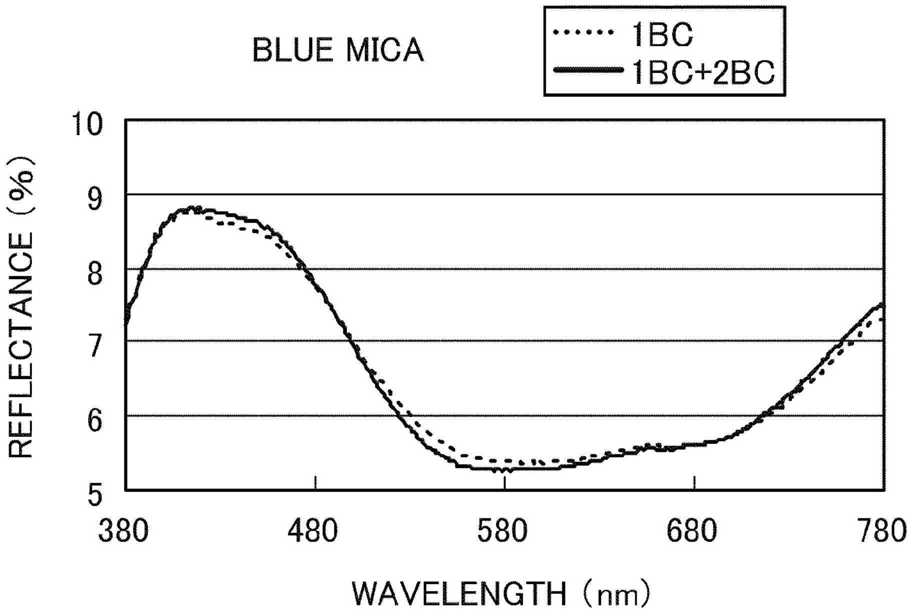
FIG. 13 is a graph illustrating spectral reflectances of a chromatic coating color (blue mica).

Here, a test piece (1BC+2BC) obtained by sequentially applying both the first and second base paints wet-on-wet onto an electrodeposition coating film, and a test piece (1BC) obtained by applying only the first base paint onto an electrodeposition coating film were fabricated. The spectral reflectances of the applied coating films of the fabricated test pieces were measured by using a spectrophotometer. The measurement results are illustrated in FIG. 13. Although not so clear from FIG. 13, the lightness of the coating color produced by the first base paint showing the blue mica color is slightly higher than that of the coating color produced by the second base paint.

Figure 14:
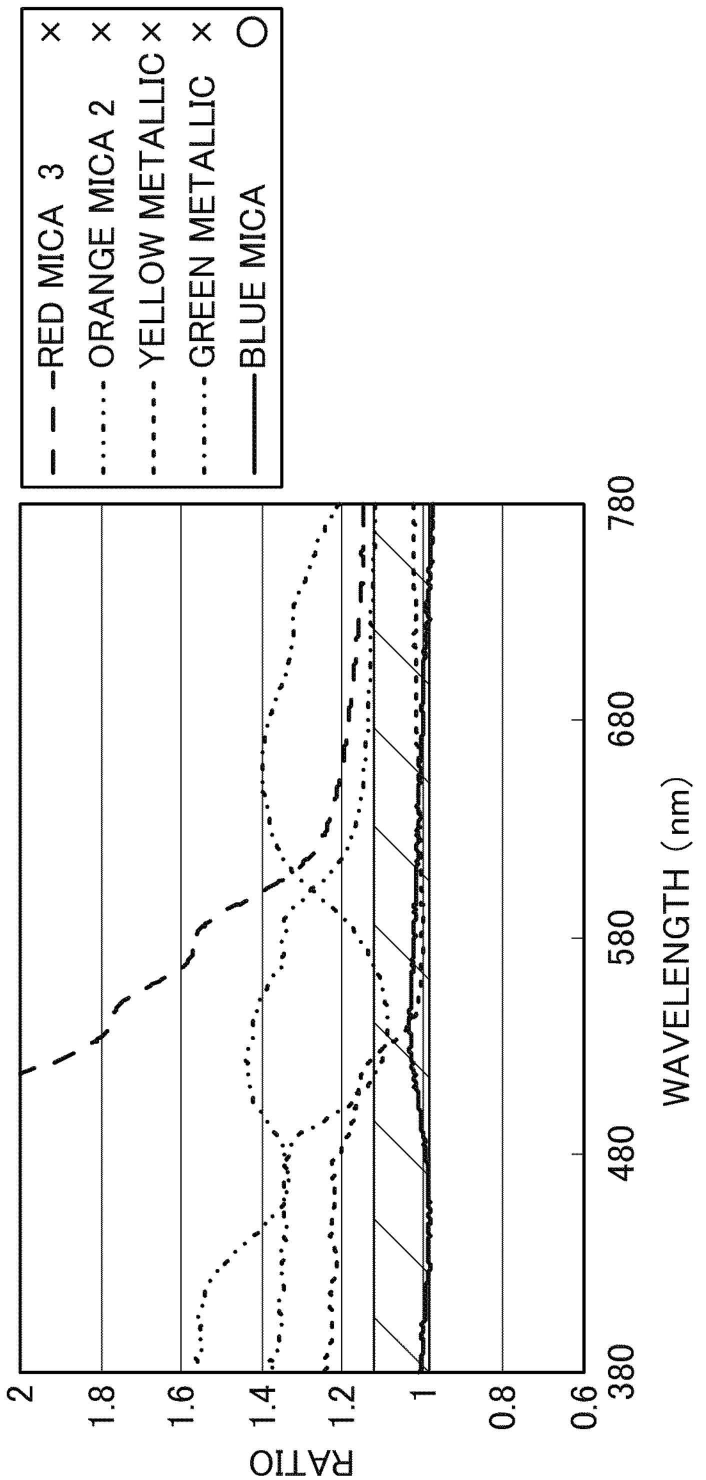
FIG. 14 is a graph illustrating the ratio between spectral reflectances of each of chromatic coating colors when the lightness of the first base coating film is higher than that of the second base coating film.

Next, the spectral reflectance ratio (1BC)/(1BC+2BC) was determined. The result was illustrated in FIG. 14. FIG. 14 also illustrates the spectral reflectance ratios (1BC)/(1BC+2BC) of coating colors other than the blue mica, i.e., red mica 3, orange mica 2, metallic yellow, and metallic green together. Since the ratios of these colors are greater than or equal to 1.0, this shows that the lightness of the coating color produced by the first base paint with relatively superior light interception characteristics is higher than that of the coating color produced by the second base paint with relatively inferior light interception characteristics.

First, in the analysis of blue mica which is marked with the symbol "○" (i.e., which did not cause viewers to feel something different about color), the ratio is generally 1.0 in the entire visible wavelength region (about 380-780 nm). By contrast, the coating colors which are marked with the symbol "x" (i.e., which caused viewers to feel something different about color) are analyzed below. The ratios of the red mica 3 and the orange mica 2 are less than or equal to about 1.2 in a longer wavelength region with wavelengths greater than or equal to about 650 nm while significantly increasing in the other wavelength region. The ratio of the metallic yellow is less than or equal to about 1.1 in a region which includes the above-described target hue range and which has wavelengths longer than about 500 nm while being about 1.2 above 1.1 in a region having wavelengths shorter than about 500 nm. The ratio of the metallic green is less than or equal to about 1.1 in the vicinity of the target hue range (in the vicinity of a wavelength of 540 nm) while being greater than or equal to about 1.2 in the other wavelength region.

The above description can show the following fact: with the use of a chromatic color as the coating color, when the lightness of the coating color produced by the first base paint is higher than that of the coating color produced by the second base paint, a situation where the ratio is small only in the target hue range of the coating color causes viewers to feel something different about color, the ratio thus needs to be small in the entire visible wavelength region (about 380-780 nm), and consequently the ratio preferably falls within the range of about 1.0-1.1.

What is claimed is:

1. A double-structure coated object comprising:
an inner plate portion;
an outer plate portion covering the inner plate portion;
a first layer made of a first paint, and configured to directly coat an electrodeposition coating film; and
a second layer made of a second paint, configured to coat the electrodeposition coating film, and superimposed on the first layer,
wherein the outer plate portion is configured to produce a target color with both the coating films which are the first layer and the second layer,
an overcoating film made of the second paint identical to that of the second layer is formed on the inner plate portion,
the target color is an achromatic color,
the coating films which are the first and second layers are similar in color,
a light interception characteristic of the first layer is superior to that of the second layer,
a color of the first layer has lower lightness than a color of the second layer, and
a ratio (1BC)/(1BC +2BC) of a spectral reflectance (1BC) of the color of the first layer to a spectral reflectance (1BC +2BC) of the target color is greater than or equal to about 0.8 and less than or equal to about 1.0 in an entire visible wavelength region of about 380-780 nm.

2. The double-structure coated object of claim 1, wherein the electrodeposition coating film is formed on a surface of the coated object, and the first layer is superimposed directly on a surface of the electrodeposition coating film.

3. A double-structure coated object comprising:
an inner plate portion;
an outer plate portion covering the inner plate portion;
a first layer made of a first paint, and configured to directly coat an electrodeposition coating film; and
a second layer made of a second paint, configured to coat the electrodeposition coating film, and superimposed on the first layer,
wherein the outer plate portion is configured to produce a target color with both the coating films which are the first layer and the second layer,
an overcoating film made of the second paint identical to that of the second layer is formed on the inner plate portion,
the target color is a chromatic color,
the coating films which are the first and second layers being similar in color,
a light interception characteristic of the first layer is superior to that of the second layer,
a color of the first layer has lower lightness than a color of the second layer, and
when a hue range is indicated by dividing a Munsell hue circle into one hundred sectors with a hue of the target color set at 0 and increasing a hue number to +50 in a counterclockwise direction while decreasing the hue number to −50 in a clockwise direction, a ratio (1BC)/(1BC +2BC) of a spectral reflectance (1BC) of the color of the first layer to a spectral reflectance (1BC +2BC) of the target color is greater than or equal to about 0.7 and less than or equal to about 1.0 in a portion of the indicated hue range which is greater than or equal to about −5 and less than or equal to about +5, and the ratio (1BC)/(1BC +2BC) is greater than or equal to about 0.9 and less than or equal to about 1.1 outside a portion of the indicated hue range which is greater than or equal to about −30 and less than or equal to about +30.

4. The double-structure coated object of claim 3, wherein the electrodeposition coating film is formed on a surface of the coated object, and the first layer is superimposed directly on a surface of the electrodeposition coating film.

5. A double-structure coated object comprising:
an inner plate portion;
an outer plate portion covering the inner plate portion;
a first layer made of a first paint, and configured to directly coat an electrodeposition coating film; and
a second layer made of a second paint, configured to coat the electrodeposition coating film, and superimposed on the first layer,
wherein the outer plate portion is configured to produce a target color with both the coating films which are the first layer and the second layer,
an overcoating film made of the second paint identical to that of the second layer is formed on the inner plate portion,
the coating films which are the first and second layers being similar in color,
a light interception characteristic of the first layer is superior to that of the second layer, a color of the first layer has higher lightness than a color of the second layer, and a ratio (1BC)/(1BC +2BC) of a spectral reflectance (1BC) of the color of the first layer to a spectral reflectance (1BC +2BC) of the target color is greater than or equal to about 1.0 and less than or equal to about 1.1 in an entire visible wavelength region of about 380-780 nm.

6. The double-structure coated object of claim 5, wherein the electrodeposition coating film is formed on a surface of the coated object, and the first layer is superimposed directly on a surface of the electrodeposition coating film.

* * * * *